May 5, 1936.  H. AUSTIN  2,039,288

CHANGE SPEED GEAR

Filed Jan. 23, 1935  2 Sheets-Sheet 1

Inventor
Herbert Austin
By Pennie Davis Marvin Edmonds
attys

May 5, 1936.  H. AUSTIN  2,039,288
CHANGE SPEED GEAR
Filed Jan. 23, 1935  2 Sheets-Sheet 2

Patented May 5, 1936

2,039,288

UNITED STATES PATENT OFFICE 2,039,288

CHANGE SPEED GEAR

Herbert Austin, Bromsgrove, England

Application January 23, 1935, Serial No. 3,024
In Great Britain January 24, 1934

6 Claims. (Cl. 74—200)

This invention relates to change speed gear of the general type in which there are two discs, one of which is driven from a suitable source of power and the other of which transmits power, and each disc has in the face which it presents to the other disc an annular concentric groove of part-circular section. The discs are spaced apart; but the sections of the grooves form part of the same circle when taken in the same plane. Such discs are known as "torus" discs and the grooves are hereinafter referred to as torus grooves. Between the discs, and running in both grooves is a set of rollers (usually three) which are prevented from revolving about the axis of the discs and the axis of each roller lies normally in a plane which includes the axis of the discs. The rollers are maintained in constant frictional engagement with the torus grooves by strong endwise pressure applied to the discs. If the axes of the rollers lie at right angles to the axis of the discs, then the speed ratio transmitted from one disc to the other is one to one; but, if the roller axes are inclined to the axis of the discs, there is a resultant alteration of speed ratio.

When the endwise pressure is strong, this alteration of speed ratio cannot easily be produced by a simple turning or rocking movement applied to the roller axes, and, therefore, the mountings or carriers for the rollers may themselves be carried in such a manner that they can be moved to a slight extent endwise, thus to cause the plane of each roller, at the point of contact, to become inclined in relation to a track concentric with the disc or each roller may be otherwise slightly inclined to the said track. Hence the rollers will tend to run or "precess" automatically to a new position or track. This action and means for limiting the precession are described in British patent specification No. 343,988.

In a gear of this type, the rollers are free to run to, and in, any track to which they have a tendency to go, and for this reason the mountings for the rollers are left free to turn each on a longitudinal axis and under the control of its respective roller.

It has been found in practice, however, that there exists a danger that, under abnormal conditions, one or more of the mountings may rock to one side or the other and bring its roller into a position which does not correspond with the other rollers whereby the gear is then trying to transmit two or more speeds at the same time so that it becomes locked and breaks down.

One object of this invention is to provide means whereby this danger can be avoided.

In known forms of gear of the above general type there are three torus discs, two end discs drivingly connected together and each having a torus groove on its inner face, and an intermediate torus disc with a torus groove on each of its faces. There are then two sets of rollers carried in two stationary mountings, one set co-acting between the intermediate disc and one end disc, and the other set co-acting between the intermediate disc and the other end disc. In such gears the change of angle of the roller axes has been effected by precession as above described.

The invention consists in connecting the carriers of the rollers of a set of rollers together by means separate from the gear-changing means and in such a manner that while the roller axes are free to follow the rocking movement which effects the change of gear ratio, each roller is positively prevented by the said connecting means from following a track which is substantially out of agreement with those which are being followed by the other rollers of the set, as they might do under abnormal conditions as indicated above. The invention further consists (in the case where there are two sets of rollers) in providing means for coupling the roller carriers of the one set to the roller carriers of the other set to guard against the same contingency.

According to another feature of the invention, each carrier is provided with a set of peripheral helical teeth and the teeth of all the carriers of one set of rollers engage with a wheel sleeve or ring having counterpart teeth and mounted with its axis coincident with the disc axis.

According to another feature of the invention which is applicable where there are two sets of rollers, the two sets are coupled together by a longitudinal member the axis of which is coincident with the disc axis, and this member may have at each end a set of helical teeth to engage corresponding helical teeth of the roller carriers at the respective end.

As the axes of the roller carriers are substantially at right angles to radii from the disc axis, the teeth engage similarly as a worm engages with a worm wheel, and the teeth at one end of the sleeve are of opposite hand to those at the other end.

A convenient embodiment of the invention is described with reference to the drawings herewith in which:—

In these drawings A A' are end torus discs and B an intermediate torus disc. The disc A has a torus groove $a$ on its inner face and the disc A' a torus groove $a'$ also on its inner face. The disc B has two torus grooves $b$ $b'$ one at each face as shown.

The disc A is mounted on one end of an arbor C and is adapted to bear outwardly against a collar $c$ of the arbor and it is drivingly connected to the collar by clutch teeth or dogs $c'$.

The disc A' is also mounted on the arbor and is connected by clutch teeth or dogs $c^2$ to a collar $c^3$ splined on the arbor.

Drive is imparted to the disc A' from a driving shaft D by way of clutch teeth $d$, a ring E and a pressure imparting device comprising balls $e$, which are placed between ball races $e'$, $e^2$, which are inclined to a plane at right angles to the disc axis. Hence the balls both transmit drive and exert end pressure on the disc A', the pressure being proportional to the torque of the drive and the reaction of the pressure is taken by the arbor C, and is not transmitted through the main bearings of the gear. This method of exerting end pressure is well known in gears of this type. The drive imparted to the disc A' is imparted to the arbor C by way of the splined collar $c^3$ and is imparted to the disc A from the arbor by way of the clutch teeth $c'$.

Figure 1:
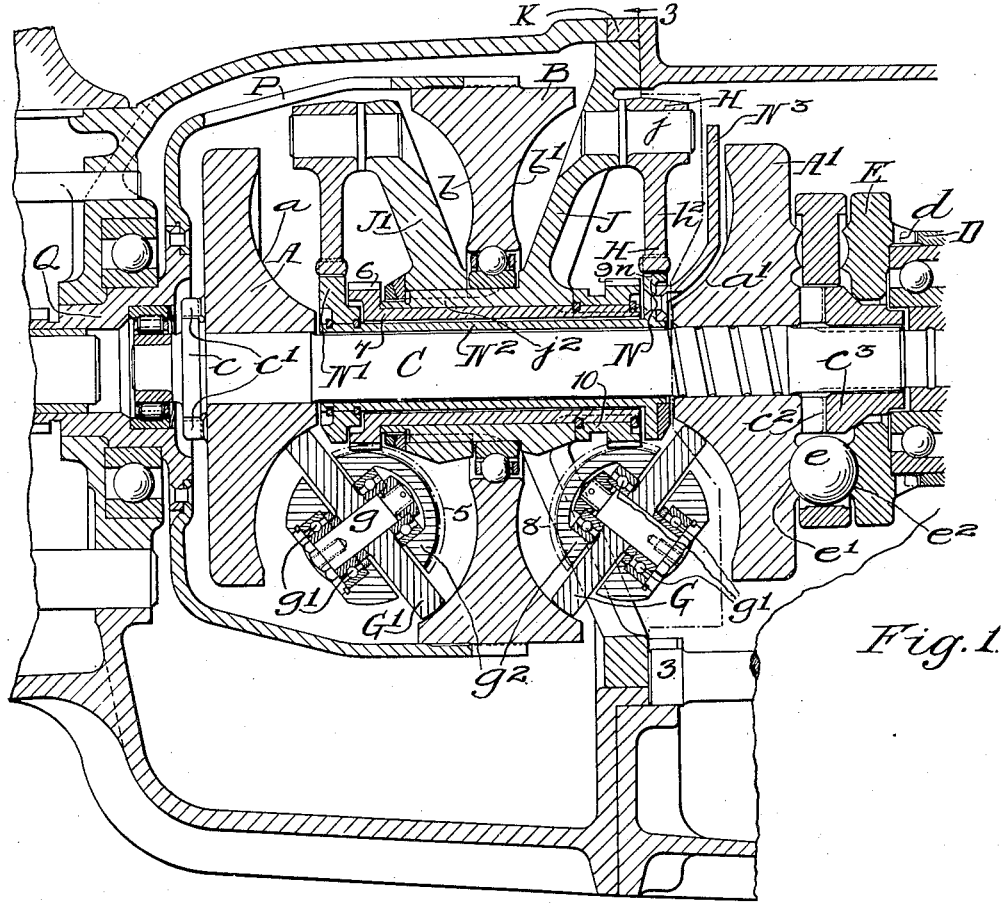
Figure 1 is a vertical longitudinal section of a torus disc gear having inter-connecting end coupling means arranged according to the invention In this view the roller axes are shown as inclined to the axis of the gear, and in the low gear position.
Figure 2:
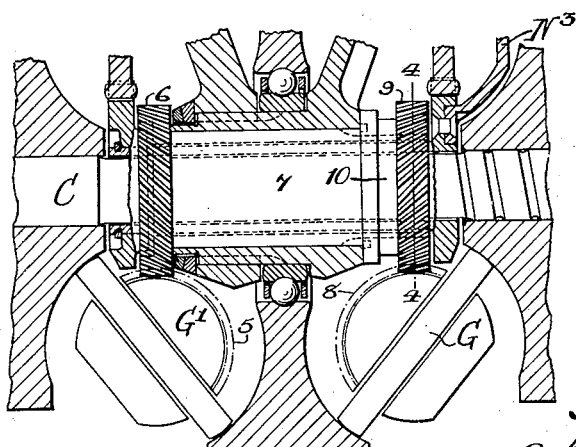
Figure 2 is a fragmentary part longitudinal sectional view but showing the coupling and interconnecting means in elevation. In this view the rollers and their mountings are indicated diagrammatically.
Figure 3:
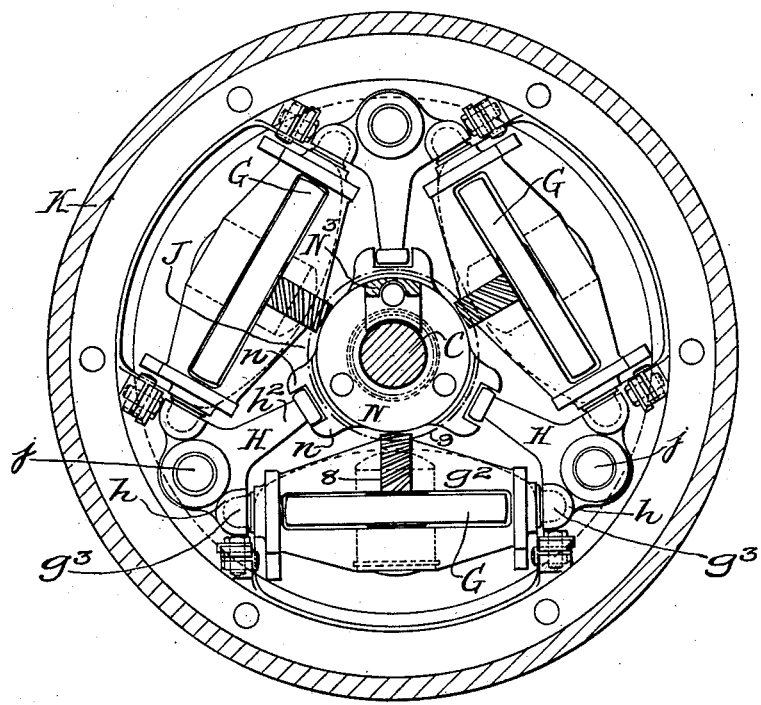
Figure 3 is a section taken on the irregular line 3, 3, of Figure 1 looking in the direction of the arrow of that figure; and, Figure 4 is a section taken on the line 4, 4, of Figure 2.
Figure 4:
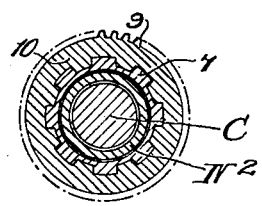

Between the disc B and the disc A' are three rollers G G G, each having an axle $g$ mounted in ball bearings $g'$ of a carrier $g^2$. Each carrier has at its end ball trunnions $g^3$ (see Figure 3) and the trunnions engage in ball cups $h$ of rockers H. Each rocker is pivotally mounted on an arm of a spider J by a pivot axis $j$ and this spider is rigidly mounted in the gear casing K.

Between the disc B and the disc A are similar rollers G' similarly mounted and the respective spider J' is splined upon a sleeve-like extension $j^2$ of the spider J. Hence the spider J' is also mounted in the casing so that it cannot turn.

Each rocker has an inwardly extending arm $h^2$ engaging between a pair of jaws $n$ $n$ of a ring N surrounding the gear axis. There is a second ring N' appertaining to the other set of rollers. These two rings are connected together by a sleeve N² and they are turned by means of a lever N³, which may be controlled by hand or by other suitable means usually operated automatically. The effect of imparting a turning movement to the sleeve is to rock the rockers H and impart endwise movement to them each in the direction of its length (and incidentally angular displacement of their trunnion axes) thus to cause precession of the rollers. The mechanism so far described is already known and the arrangement of the roller carriers to produce precession of the rollers and the means for stopping such precession is described in British patent specifications Nos. 343,988 and 344,061. It may, however, be mentioned that the trunnion axes are slightly inclined to the plane of the paper as described in British patent specification No. 344,061 and this has the effect of arresting the precession, when the roller carriers have rocked to a degree depending on the amount of endwise movement imparted.

The intermediate torus disc B is turningly mounted on the sleeve $j^2$ and receives drive from the rollers at either side. The drive from the disc B is taken by way of a casing P to the driven shaft Q in a manner already known.

The additions made in carrying out the present invention will now be described.

On each roller carrier $g^2$ of the left hand set there is provided a set of peripheral helical teeth 5 and the teeth of all the carriers of this set mesh with a set or ring of helical teeth 6 of a sleeve 7 surrounding the gear axis and turningly mounted within the extension $j^2$. There are corresponding sets of teeth 8 on the carriers of the right hand set and these mesh with helical teeth 9 on the right hand end of the sleeve 7. The teeth 9 are the opposite hand to the teeth 6. The teeth 9 are not formed directly on the sleeve 7 but on a wheel 10 which is splined on the right hand end of the sleeve.

By the above means not only are the carriers of each set connected together to act in unison, but the carriers of the one set are coupled to those of the other set so that the rollers of one set must rock in unison with those of the other, but in the opposite direction.

Having fully described my invention what I claim and desire to secure by Letters Patent is:—

1. A change speed gear comprising two discs, said discs having oppositely disposed annular torus grooves, a set of rollers of which all the rollers engage in both grooves, carriers in which the rollers are mounted, said carriers being mounted to rock about axes which are substantially at right angles to the axes of said discs and to lie substantially in a plane parallel to the planes of the discs, means for moving the carriers in a manner to incline the rollers to their tracks in the grooves and thereby cause the carrier to rock to effect the change of gear ratio, means for arresting the rocking movement, and means separate from the gear-changing means for connecting together the carriers of the set of rollers in such a manner that, while the roller axes are free to follow the rocking movement, each roller is prevented from following a track which is out of agreement with that which is being followed by the other rollers.

2. A change speed gear comprising three discs of which two are end discs and are coupled together while the third is an intermediate disc, each of said end discs having an annular torus groove on its inner face, said intermediate disc having oppositely disposed torus grooves on its opposite faces, two sets of rollers, one set between one end disc and the intermediate disc and the other set between the intermediate disc and the other end disc, the rollers of each set engaging in the two grooves of the disc faces between which said rollers lie, carriers in which the rollers are mounted, said carriers being mounted to rock above axes substantially at right angles to the disc axis, and lying substantially in a plane parallel to the plane of the discs, and means for moving the carriers in a manner to incline the rollers to their tracks in the grooves, and thereby cause the carriers to rock to effect the change of gear ratio, means for arresting the rocking movement, means separate from the gear-changing means for connecting together the carriers of each set of rollers and means separate from the gear-changing means for coupling the carriers of one set to those of the other set, said connecting and said coupling being effected in such a manner that, while the roller axes are free to follow the rocking movement, each roller is prevented from following a track which is out of agreement with those which are being followed by the other rollers.

3. A change speed gear comprising three discs of which two are end discs and are coupled together while the third is an intermediate disc, each of said end discs having an annular torus groove in its inner face, said intermediate disc having oppositely disposed torus grooves on its opposite faces, two sets of rollers, one set between one end disc and the intermediate disc, and the other set between the intermediate disc and the other end disc the rollers of each set engaging in the two grooves of the discs faces between which said rollers lie, carriers in which the rollers are mounted, said carriers being mounted to rock about axes substantially at right angles to the disc axis, and lying substantially in a plane parallel to the planes of the discs, means for causing rocking of the roller carriers to effect change of gear ratio, means separate from the gear-changing means for connecting together the carriers of each set of rollers, and a member having its longitudinal axis coincident with the axis of the discs, said member being separate from the gear-changing means and operative to couple the roller carriers of the one set to those of the other set, so that the rollers of the one set are prevented from following tracks which are out of agreement with the tracks followed by the rollers of the other set.

4. A change speed gear as set forth in claim 1 in which the means for connecting together the carriers of the set of rollers comprises peripheral helical teeth on each carrier, and a ring member having its axis coincident with the gear axis and having helical teeth meshing with the peripheral teeth of all of the carriers.

5. A change speed gear as set forth in claim 2 in which the means for connecting together the carriers of each set of rollers comprises peripheral helical teeth on the carriers of each set, and a member having its longitudinal axis coincident with the axis of the discs and having two sets of helical teeth, said sets of helical teeth meshing repectively with the peripheral helical teeth of the carriers of each set of carriers.

6. A change speed gear as set forth in claim 2 in which the means for connecting together the carriers of each set of rollers comprises peripheral helical teeth on the carriers of each set, a member having its longitudinal axis coincident with the axis of the discs and having two sets of helical teeth, said sets of helical teeth meshing respectively with the peripheral helical teeth of the carriers of each set of carriers, the helical teeth of one of the sets on said member and the helical teeth on the carriers with which they engage being right hand, and the helical teeth of the other set on the member and the helical teeth on the carriers with which they engage being left hand.

HERBERT AUSTIN.